March 24, 1936.  J. L. EARL  2,035,115
TRACTION INCREASING MEANS
Filed Nov. 2, 1933
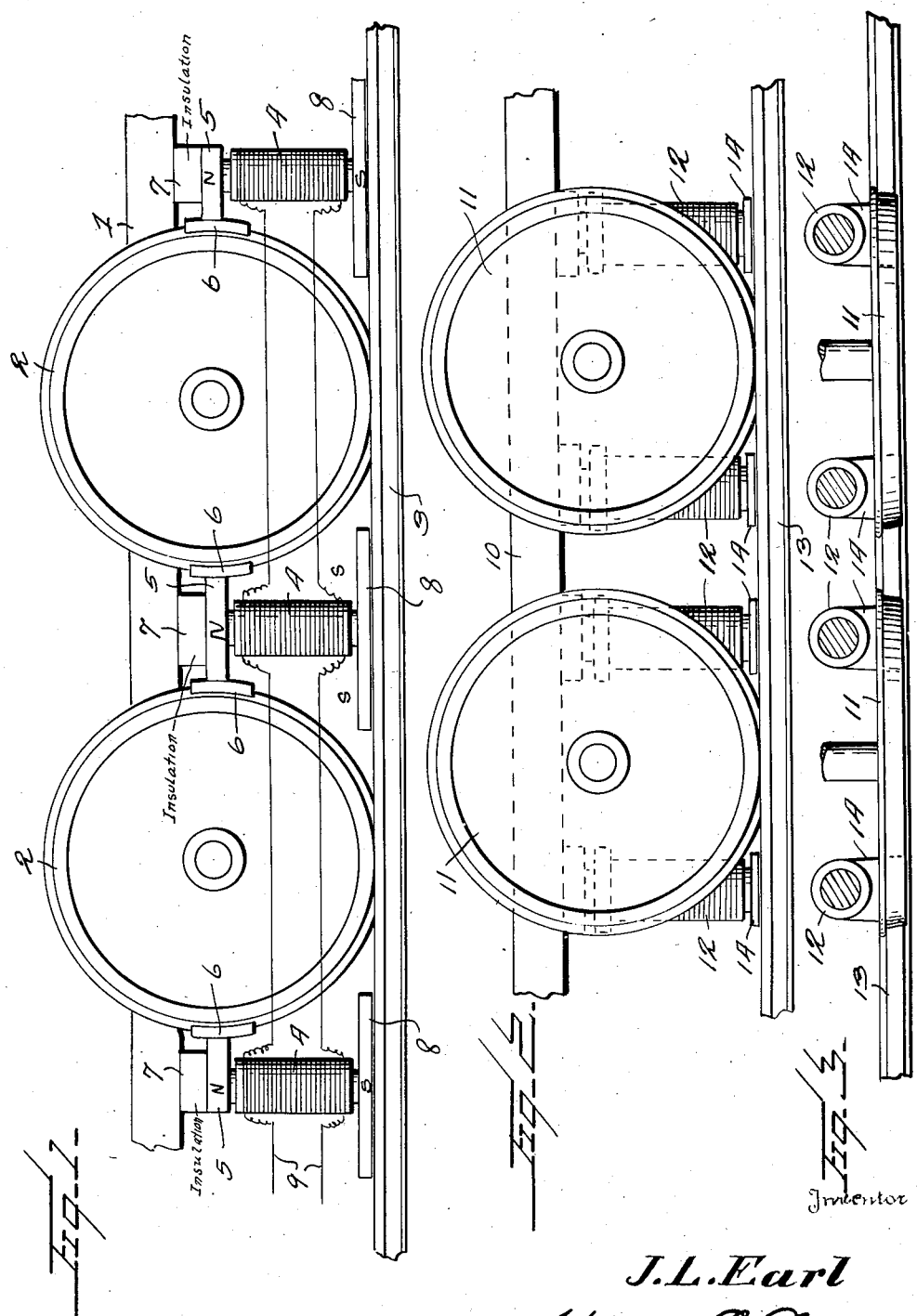
Inventor
J. L. Earl
By Watson E. Coleman
Attorney Patented Mar. 24, 1936

2,035,115

UNITED STATES PATENT OFFICE 2,035,115

TRACTION INCREASING MEANS

John L. Earl, San Antonio, Tex.

Application November 2, 1933, Serial No. 696,434

2 Claims. (Cl. 105—77)

This invention relates to improvements in traction increasing devices for trains and pertains particularly to an electrical means for effecting this result.

The primary object of the present invention is to provide an improved electrical means for increasing the traction of metallic railway wheels upon the metallic rails by means of electrical force, with a minimum expenditure of the same.

A further object of the invention is to provide improved electrical means for increasing the traction of railway car and locomotive wheels by electrical force in such a manner as to prevent the loss of the electric current in the metallic parts of the train structure.

Heretofore electrical means has been employed for increasing traction of metallic wheels on metallic rails but the methods employed have been such that current losses occur because of the use of a large portion of the car structure as a current carrying means. With the structure embodying the present invention, this undesirable condition is overcome by the disposition of electromagnets in such a way that while a portion of the metal structure of the car is employed for carrying current, this is reduced to such an extent that the loss of current is cut down to a negligible amount.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 represents diagrammatically and in side elevation two driver wheels of a locomotive showing the same upon a track rail and showing the structure embodying the present invention associated therewith.

Figure 2 is a view similar to Figure 1 but showing a different arrangement of electrical devices.

Figure 3 is a view in plan of the wheels shown in Figure 2 showing in horizontal section the electromagnets associated therewith.

Referring to the drawing wherein like numerals of reference designate corresponding parts throughout the several views, the numeral 1 indicates a conventionally illustrated portion of the truck or frame of a locomotive which is carried by driver wheels which are indicated by the numeral 2. These wheels are mounted upon a track rail which is indicated by the numeral 3.

In carrying out the present invention, there is disposed over the track rail 3 a series of electromagnets, each of which is indicated by the numeral 4, one of which magnets is disposed between the driver wheels, as shown, while the other ones are at the outside of the wheels or opposite the central magnet. Each of these magnets has connected with its north pole, the metallic head 5, which has one end disposed in close proximity to the tread surface of the adjacent wheel, as indicated at 6. The magnet which is disposed between the wheels has the head body 5 extended to a position in close proximity to both of the wheels, while the magnets at the far side of the wheels have the heads extended in one direction only, as illustrated.

These magnets 4 are connected by suitable insulating bodies 7 with the frame or truck 1 of the locomotive so that they will be suspended therefrom and the lower or south pole ends of the magnets overlie the track rail 3 and each has in electrical connection therewith the elongated metal foot 8, which extends longitudinally of the rail in the manner illustrated.

As illustrated, the north pole end of each magnet is adjacent the tread of a wheel 2, while the south pole end is adjacent the track rail 3, so that when current is passed by means of the wires 9 through the magnets, the field setup will include in its path the tread surface of the wheel adjacent the magnet, the magnetic field extending from the north pole of the magnet to the tread and following this down to its point of contact with the rail 3 and then following the rail back to the south pole of the magnet to complete the magnetic path.

It will thus be seen that the only portion of each wheel which is affected by the electrical field is the part of the tread thereof which lies between the north pole of each magnet and the point where the tread engages the rail. By this means, an attraction is established between the rail and each wheel as the magnetic effect tends to draw the wheel and rail into closer contact and thus prevent slipping of the wheel and also resist separation of wheel and rail.

No particular means has been illustrated for controlling the flow of current to the magnets or for supplying the same with current as it will be obvious that the current may be supplied by a storage battery or a generator carried by the locomotive, and when it is necessary that the traction be increased, suitable switch means may be devised for the use of the locomotive engineer for closing the magnet circuits. If the magnets are supplied by generators which are operated by the drive wheels or axles of the locomotive, the circuit to the magnets may be permanently closed so that they will be energized at all times while the locomotive is in motion.

In locomotive or other car structures where the drive wheels are so closely spaced together that it would be impossible or inconvenient to dispose the electromagnets between the wheels, the structures illustrated in Figures 2 and 3 may be employed, wherein the magnets may be mounted upon the truck or frame 10 upon the inner sides of the wheels 11. These magnets are indicated by the numerals 12 and instead of having the metallic foot members extended longitudinally of the rail 13 in the manner of the foot members 8 shown in Figure 1, the foot members of these magnets, which are here indicated by the numerals 14, are extended laterally across the rail 13 to position between the rail and the treading surface of the adjacent wheel 11. Although a different disposition of the electromagnets is employed, the effect obtained is exactly the same as that described in connection with the structure illustrated in Figure 1.

While the magnets illustrated have been shown and described as having the north poles at the upper ends and the south poles at the lower ends, it is, of course, to be understood that it is not necessary that this particular arrangement of the poles be adhered to in order to be within the scope of the invention for the wiring connections may be reversed so that the positive pole will be at the bottom and the negative pole at the top or, in other words, the north poles will be adjacent the rails while the south poles of the magnets will be adjacent the wheels.

What is claimed is:—

1. Traction increasing means for locomotive or other wheel structures having metallic wheels operating on metallic rails, comprising an electromagnet disposed over the track rail and adjacent the tread of a wheel, a metallic head on each magnet having a portion in close proximity to but permanently free of contact with the adjacent wheel tread, and a metallic foot upon each magnet disposed over and in close proximity to but permanently spaced from the track rail, and means for conducting current to the magnets.

2. Traction increasing means for locomotive or other wheel structures having metallic wheels operating on metallic rails, comprising a plurality of electromagnets each disposed adjacent a wheel upon the inner side of the latter, a foot formed of metallic material and extending laterally from the lower end of each magnet across the track rail between the wheel tread and the rail and permanently free from contact with the same, and means for conducting electric current to said magnets, the upper end of each of said magnets being arranged with respect to the adjacent wheel whereby the field of the magnet will include a portion of the wheel and rail.

JOHN L. EARL.